C. R. DOWNS.
SULFONATION OF HYDROCARBONS AND HYDROCARBON DERIVATIVES.
APPLICATION FILED JAN. 5, 1918.
1,279,296.
Patented Sept. 17, 1918.
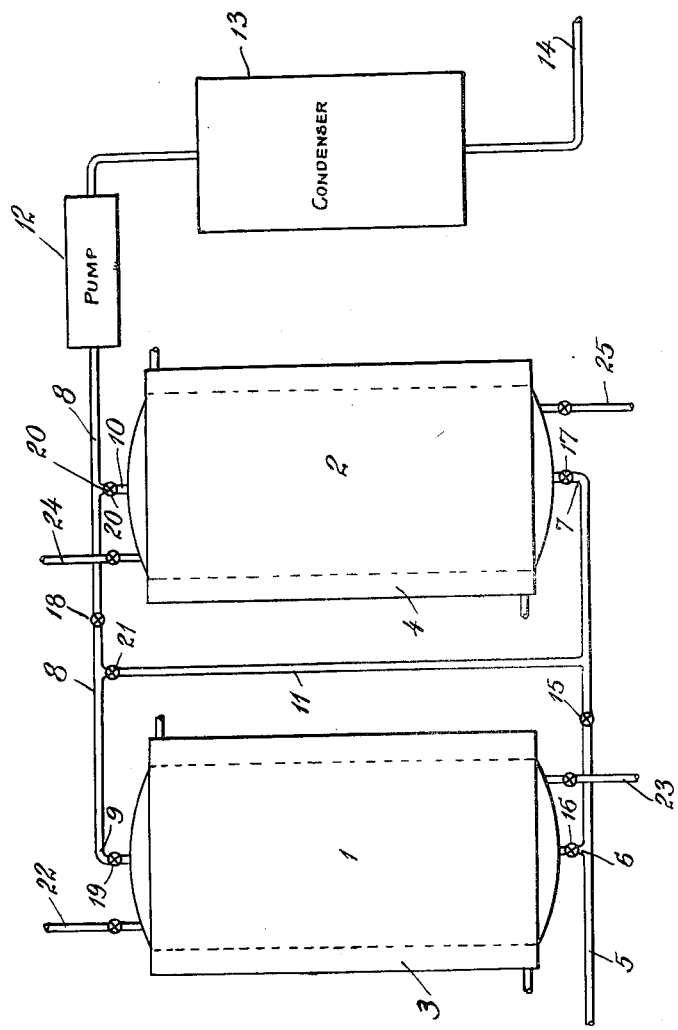
INVENTOR
Charles R. Downs
BY
Chas. W. Mortimer
ATTORNEY

UNITED STATES PATENT OFFICE.

CHARLES R. DOWNS, OF CLIFFSIDE, NEW JERSEY, ASSIGNOR TO THE BARRETT COMPANY, A CORPORATION OF WEST VIRGINIA.

SULFONATION OF HYDROCARBONS AND HYDROCARBON DERIVATIVES.

1,279,296.   Specification of Letters Patent.   Patented Sept. 17, 1918.

Application filed January 5, 1918. Serial No. 210,534.

*To all whom it may concern:*

Be it known that I, CHARLES R. DOWNS, a citizen of the United States, residing at Cliffside, in the county of Bergen and State of New Jersey, have invented certain new and useful Improvements in the Sulfonation of Hydrocarbons and Hydrocarbon Derivatives, of which the following is a specification.
This invention relates to the sulfonation of hydrocarbons and hydrocarbon derivatives and to the production of sulfonated derivatives therefrom in a novel and advantageous manner.
The sulfonation of hydrocarbons and hydrocarbon derivatives, for example, benzene, involves the substitution of one or more hydrogen atoms of the aromatic nucleus by sulfonic acid groups, with accompanying formation of water. As the sulfonation reaction progresses, the formation of water likewise progresses, and the water formed, unless removed, dilutes the reaction mixture and the acid present and correspondingly retards the sulfonating process.

According to the present invention, the water formed during the progress of the sulfonation reaction is removed in a novel and highly advantageous manner so that the reaction can be made to proceed to substantial completion and so that the reaction can be readily controlled and regulated.

According to the present invention, the hydrocarbon or hydrocarbon derivative is brought into contact with the sulfonating acid, of proper strength for the sulfonation, and at the appropriate temperature for the sulfonation, and the strength of the acid is maintained during the progress of the sulfonation by subjecting the reaction mixture to a degree of vacuum sufficient to remove the water formed and to maintain the acid of proper strength, and at the proper temperature.

Where the hydrocarbons or hydrocarbon derivatives are of a non-volatile character, the appropriate proportions of the acid and of the hydrocarbons or hydrocarbon derivatives may be combined at the outset, and the reaction mixture heated to the temperature appropriate to the formation of the desired sulfonation products. As the sulfonation proceeds, and water is formed, the reaction mixture will be diluted thereby and the progress of the reaction thereby impeded unless the water is removed. This water is, according to the present invention, removed by maintaining a sufficient vacuum, so that the water will be removed as formed, and the concentration of the acid thereby maintained. This maintenance of the proper strength of the acid, together with the maintenance of the proper temperature for the reaction, will enable the sulfonation process to proceed in a smooth and regular manner and to substantial completion.

Where the hydrocarbon or hydrocarbon derivative is of a volatile character, it will be evident that the tendency of the vacuum will be to remove any excess thereof along with the water of reaction. In such cases, it is advantageous to admit the hydrocarbon or hydrocarbon derivative in a continuous manner during the progress of the reaction and to cause intimate contact thereof with the sulfonating acid, so that sulfonation will take place without any considerable volatilization of the substances introduced, although any excess thereof may be volatilized and recovered from the water of condensation.

The invention will be described more in detail in connection with the sulfonation of benzene, and the production therefrom of the mono- and di-sulfonic acid derivatives.

In the sulfonation of benzene to form the mono-sulfonic acid derivative, the strength of the acid may be, for example, around 75 to 100 per cent. $H_2SO_4$ or preferably 80 to 98 per cent. $H_2SO_4$; and the temperature will usually be around 100° to 120° C. or even up to 140° C. Since benzene is readily volatilized, it is advantageous to add the benzene to the sulfonating acid in a continuous and progressive manner. The sulfonating acid may thus be maintained at the temperature appropriate to the sulfonation, which temperature is above the boiling point of benzene, so that the benzene will be vaporized as soon as it comes in contact with the acid, if it is introduced in liquid form. By introducing the benzene in a continuous and progressive manner, as the reaction proceeds, and by effecting the necessary intimacy of contact of the benzene vapors and of the acid, the benzene can be sulfonated during its contact with the acid, so that no material excess thereof is removed by the vacuum, although any excess which is so removed may be readily recovered, by condensation, and returned to the process.

During the admission of the benzene, the reaction mixture is maintained under a sufficient vacuum to remove water from the reaction mixture and to maintain the desired strength of the acid. It will be evident that the vacuum may vary somewhat depending upon the temperature of the reaction and the speed at which the benzene is introduced and the water formed, but the strength of the acid, the temperature, and the vacuum, should be coördinated so as to maintain the acid at the proper strength and at the proper temperature. By the use of a proper vacuum, the temperature can be kept sufficiently low so that higher sulfonation than the desired mono-sulfonic acid production does not take place to any material extent.

In the case of the formation of di-sulfonic acid from benzene, it is common to start with a stronger acid, usually oleum, and to finish the sulfonation at a materially higher temperature, e. g., up to 260° C. Above about 260° C. carbonization tends to take place, so that this temperature may be considered as about the upper limit at which the sulfonation process may be carried out. By maintaining the reaction mixture under an appropriate vacuum, it is nevertheless possible to carry out the reaction at temperatures not above 260° C., and thereby avoid danger of carbonization. The benzene may thus be introduced in the manner above described, that is, continually during the progress of the sulfonation, and the proper strength of the acid can be maintained by an appropriate vacuum, so that the production of the di-sulfonic acid derivative will take place in a smooth and continuous manner.

The invention will be further described in connection with the accompanying drawing which shows, by way of diagram, an arrangement of apparatus appropriate to the practice of the invention.

In the diagrammatic illustration of the accompanying drawing, two sulfonators are indicated respectively at 1 and 2, provided with heating jackets 3 and 4 for heating the sulfonators in any appropriate manner, as by steam or oil. An inlet or supply pipe 5 is provided for the benzene or other hydrocarbon or hydrocarbon derivative. In the case of benzene, the benzene may be supplied in a liquid form or it may be vaporized and preheated and supplied in the form of a vapor. The supply pipe 5 is provided with branches 6 and 7 leading to the bottom of the sulfonators 1 and 2. Corresponding branches 9 and 10 are provided at the tops of the sulfonators and are connected with the pipe 8 which leads to the vacuum pump 12. A cross connection pipe 11 connects the inlet pipe 5 with the vacuum pipe 8. Beyond the pump is shown a condenser 13 with outlet therefrom leading to any appropriate place of storage or further use of the condensed liquids.

The various inlet and outlet pipes and pipe connections are provided with regulating valves indicated, respectively, by the reference characters 15 to 21, inclusive. The sulfonators are provided with supply pipes 22 and 24 and draw off pipes 23 and 25.

In the practice of the process, the acid of appropriate strength may be introduced into the sulfonators 1 and 2, or mixtures of the acid and non-volatile hydrocarbons or hydrocarbon derivatives. When a volatile hydrocarbon, such as benzene, is to be sulfonated, the acid itself may be introduced into the sulfonators and the benzene introduced by means of the pipe 5. By closing the valve 21, and opening the valves 15, 16, 17, 18, 19 and 20, the two sulfonators will be arranged in parallel so that the benzene may enter through the branch pipes 6 and 7 and sulfonation take place in the respective sulfonators. The acid or the reaction mixture can be maintained at the proper temperature by means of the heating jackets 3 and 4. The vacuum will be maintained by the pump 12, and the two sulfonators will be maintained at the same vacuum, so that the conditions within the two sulfonators can be maintained substantially alike. It will be evident that by closing the valves 16 and 19, or by closing the valves 17 and 20, either sulfonator may be disconnected and the other sulfonator still operated, thus providing for the charging or discharging of either sulfonator without interfering with the operation of the other.

By closing the valves 15 and 18, and by keeping the valves 16, 19, 21, 17 and 20 open, the two sulfonators will be arranged in series and the vapors coming off from the first sulfonator will be passed into the bottom of the next sulfonator. So, also, the vacuum will be supplied directly to the second sulfonator and indirectly to the first sulfonator, so that the first sulfonator will be under a somewhat less vacuum than the second. By this arrangement, any benzene carried through the first sulfonator will be subjected to sulfonation in the second sulfonator. In case more than two sulfonators are used, the sulfonators may correspondingly be arranged in series, and the unsulfonated benzene subjected to sulfonation in the successive sulfonators of the series. In such cases, the water of reaction will pass through the successive sulfonators, provided the proper vacuum and temperature conditions are maintained. Where more than two sulfonators are thus operated in series, and the benzene is passed first to the first sulfonator and only the excess benzene passed to the second, the reaction may become completed in the first sulfonator before it is in the second. In such cases, the first sulfonator may be disconnected and the second sulfonator then may be made the first of the series, by proper regulation of connections and control valves.

It will be evident that, with a series of sulfonators, the vacuum to which these different sulfonators are subjected, will vary progressively from the first to the last, due to the heads of acid in the different sulfonators. This difference in the vacuum would cause the sulfuric acid to become progressively stronger in the sulfonators subjected to the higher degrees of vacuum, provided the sulfonators were all maintained at the same temperature. Accordingly, where the sulfonators are arranged in series, there is a limit to the number of sulfonators which can be utilized.

Inasmuch as the production of benzene disulfonic acid requires a higher temperature, and a higher vacuum, than the production of mono-sulfonic acid, the two sulfonators illustrated in the drawing may be used for the production, one of mono-sulfonic acid, and the other of di-sulfonic acid. Thus, if the sulfonator 1 is used for the production of mono-sulfonic acid, and the sulfonator 2 for the production of di-sulfonic acid, the higher degree of vacuum to which the sulfonator 2 is subjected can be made to correspond to the higher degree of vacuum required for the removal of water in the second sulfonator and for the maintenance of the acid at the higher degree of concentration required for the di-sulfonic acid reaction.

It will be evident that various types of construction can be used for the sulfonators, and for insuring the necessary intimacy of contact of the acid and of the hydrocarbon or hydrocarbon derivatives to be sulfonated. Where benzene is introduced in a vapor form, or in a liquid form and vaporized by contact with the hot acid, the reaction is one between a liquid and a vapor, and the problem is therefore to secure the necessary intimacy of contact to enable the reaction to take place before the benzene can rise to the top of the acid and escape unchanged. While such escape of the benzene is not prejudicial, it is nevertheless feasible to secure the sulfonation of a very considerable proportion of the benzene introduced while it is passing through the sulfonating acid.

Where it is desired to produce higher sulfonated derivatives, for example, benzene disulfonic acid, the entire amount of benzene may be first added to the acid required for the complete reaction, and the benzene thereby combined in the form of mono-sulfonic acid which is non-volatile. This formation of mono-sulfonic acid, however, will be accompanied by a formation of water which will dilute the acid and preclude further progress of the sulfonation. The thus partially sulfonated and diluted mixture may be then subjected to vacuum, at the proper temperature, in the manner above described, and the further removal of the water and completion of the sulfonation effected in a manner similar to that above pointed out. This specific procedure, however, while it is within the general scope of the present invention, and is intended to be included within the more comprehensive claims of the present application, is made the subject matter of a separate application, Ser. No. 210,535 filed January 5, 1918, with specific claims directed thereto, while the specific claims of the present application are directed to the continuous procedure in which a volatile hydrocarbon or hydrocarbon derivative is introduced in a continuous manner. The more comprehensive claims of the present application are intended to include the broader aspects of the invention, whether the hydrocarbon or hydrocarbon derivative is added at the outset or in a continuous manner, and whether the substance to be sulfonated is a hydrocarbon or a hydrocarbon derivative, and whether it has previously been subjected to a lower degree of sulfonation or not.

I claim:

1. The method of sulfonating hydrocarbons and hydrocarbon derivatives, which comprises subjecting the same in admixture with the sulfonating acid to the temperature required for the sulfonation, and to a sufficient degree of vacuum to remove water from the reaction mixture.

2. The method of sulfonating hydrocarbons and hydrocarbon derivatives, which comprises adding the same to the sulfonating acid, heating the reaction mixture to the temperature required for the sulfonation, and subjecting the resulting mixture, during the progress of the sulfonation, to a sufficient degree of vacuum to remove the water formed during the sulfonation.

3. The method of sulfonating volatile hydrocarbons and hydrocarbon derivatives, which comprises introducing the same into the sulfonating acid and bringing about the intimate contact therewith at the temperature required for the sulfonation, and subjecting the resulting mixture to a sufficient degree of vacuum to remove the water formed during the reaction.

4. The method of sulfonating volatile hydrocarbons and hydrocarbon derivatives, which comprises progressively introducing the same into the sulfonating acid maintained at the temperature required, for the sulfonation, and effecting the removal of the water of reaction from such acid by the application of a sufficient degree of vacuum thereto.

5. The method of sulfonating volatile hydrocarbons and hydrocarbon derivatives, which comprises progressively introducing the same into a body of sulfonating acid maintained at the temperature required for the sulfonation, subjecting the resulting mixture to a sufficient degree of vacuum to remove the water of reaction and any unsulfonated hydrocarbons and hydrocarbon derivatives, and passing the unsulfonated components thus removed into a further body of sulfonating acid similarly maintained at the sulfonating temperature and under a vacuum.

6. The method of sulfonating volatile hydrocarbons and hydrocarbon derivatives, which comprises progressively introducing the same, in a vaporized state, into a body of sulfonating acid, effecting the intimate intermixture of the same with the sulfonating acid, and subjecting the resulting mixture to a sufficient degree of vacuum to remove water of reaction therefrom.

7. The method of sulfonating volatile hydrocarbons and hydrocarbon derivatives, which comprises progressively passing the same through a series of bodies of sulfonating acid, maintained at sulfonating temperatures, and under a sufficient vacuum to remove water and maintain the acid at the strength required for the sulfonation.

8. The method of sulfonating benzene, which comprises adding the benzene to the sulfonating acid and subjecting the reaction mixture to the temperature required for the sulfonation and to a sufficient degree of vacuum to remove water from the reaction mixture.

9. The method of sulfonating benzene, which comprises introducing the benzene into a body of the sulfonating acid maintained at the sulfonating temperature, and subjecting the reaction mixture to a sufficient degree of vacuum to remove the water formed during the reaction.

10. The method of sulfonating benzene, which comprises progressively introducing the benzene into a body of sulfonating acid maintained above the boiling point of the benzene and at the sulfonating temperature, whereby the benzene is vaporized in contact with the sulfonating acid, effecting the intimate intermixture of the vaporized benzene with the sulfonating acid to promote the sulfonation, and subjecting the reaction mixture to a sufficient degree of vacuum to remove water of reaction therefrom and to maintain the acid at the strength required for the sulfonation.

11. The method of sulfonating hydrocarbons and hydrocarbon derivatives, which comprises subjecting the same in admixture with the sulfonating acid to a substantially constant temperature at a sufficient degree of vacuum to remove water from the reaction mixture.

12. The method of sulfonating benzene, which comprises introducing the benzene into a body of the sulfonating acid maintained at a substantially constant temperature, and subjecting the reaction mixture to a sufficient degree of vacuum to remove the water formed during the reaction.

In testimony whereof I affix my signature.

CHARLES R. DOWNS.